United States Patent

[11] 3,618,053

[72] Inventors James R. Hudson
Charlestown;
John G. Gregory, White Marsh, both of Md.
[21] Appl. No. 889,604
[22] Filed Dec. 31, 1969
[45] Patented Nov. 2, 1971
[73] Assignee Westinghouse Electric Corporation
Pittsburgh, Pa.

[54] TRAPPED CHARGE MEMORY CELL
12 Claims, 3 Drawing Figs.

[52] U.S. Cl. .......... 340/173 R, 307/238, 307/279
[51] Int. Cl. .......... G11c 5/02, G11c 11/40, G11c 7/00
[50] Field of Search .......... 340/173; 307/238, 279

[56] References Cited
UNITED STATES PATENTS 3,483,400 12/1969 Washizuka et al. .......... 307/238 X
3,510,849 5/1970 Igarashi .......... 307/279 X
3,524,077 8/1970 Kaufman .......... 307/238 X

*Primary Examiner*—Stanley M. Urynowicz, Jr.
*Attorneys*—F. H. Henson and E. P. Klipfel

ABSTRACT: A memory cell comprised of three metal oxide semiconductive field effect transistors (MOSFET) coupled to the word address line and a digit data line of a binary digital memory array through a fourth metal oxide semiconductive field effect transistor. The cell is operated by three clocked supply potentials to allow the three MOSFETs to be selectively turned "on" and "off" enabling a charge to be trapped at one of the two circuit node capacitances. Also, the digit data line includes means for being precharged to a predetermined level during an initial portion of the read mode for providing nondestructive readout of the logic state of the memory cell. The memory cell includes a "refresh" mode of operation wherein the three phase clocked supply potential restores the charge state of the node capacitance having a charge thereon to a full charge thereby restoring any charge decay which would occur over long time intervals.

TRAPPED CHARGE MEMORY CELL

CROSS-REFERENCE TO RELATED APPLICATIONS

The subject invention is related in one or more aspects of its operation to an application entitled "Complementary MOSFET Memory Cell," Ser. No. 889,603 filed on Dec. 31, 1969 in the name of James R. HUdson and James R. Cricchi. Said application is also assigned to the assignee of the present invention.

BACKGROUND OF THE INVENTION

1. Field of the Invention

This invention relates generally to digital memory apparatus and more particularly to very fast low-power semiconductor memory cells utilizing integrated circuit techniques and wherein metal oxide semiconductor field effect transistors are preferably utilized in an integrated circuit designed on a monolithic substrate.

2. Description of the Prior Art

Digital memory cells utilizing metal oxide semiconductor field effect transistors (MOSFET) and memory arrays made up of these devices are well known to those skilled in the art. For example, U.S. Pat. No. 3,447,137 issued to R. Feurer discloses such apparatus. Secondly, field effect transistor circuitry utilizing the concept of the trapped charge of a capacitor is disclosed in U.S. Pat. No. 3,448,295 entitled "Four Phase Clock Circuit," issued to F. M. Wanlass. The concept of trapping a charge on a circuit node capacitance of a field effect transistor memory cell is also disclosed in a publication entitled "IBM Technical Disclosure Bulletin," Volume 11, Number 8, Jan. 1969 at page 997, by F. H. Gaensslen. This publication discloses a field effect transistor diode stored charge memory cell wherein the node capacitance of the circuit is comprised of the inherent distributive capacitances of the field effect devices.

While the foregoing prior art operates in its intended manner, the subject invention is directed to an improved digital memory cell utilizing MOSFET devices and the trapped charge concept for one mode of its operation.

SUMMARY

Briefly, in accordance with the present invention, a memory cell is provided which includes three field effect devices, preferably metal oxide semiconductor field effect transistors (MOSFET) having gate, source, and drain electrodes. The first MOSFET has its drain terminal connected to the gate terminal of the second MOSFET and defining a first circuit node thereat and including a node capacitance while the gate terminal of the first MOSFET is commonly connected to the drain terminal of the second MOSFET and the source terminal of the third MOSFET defining a second circuit node thereat including a second node capacitance. The third MOSFET has its gate and drain terminals commonly connected to a first clocked supply potential applied thereto from a clock source generating a plurality of clocked supply potentials. The source terminals of the first and second MOSFET are respectively coupled to second and third clock power supply potentials from said clock source. The fourth field effect device, also preferably a MOSFET is adapted to be a selector switch which couples the first circuit node to a common input/output digit data line by means of its drain and source terminals as well as to a word address line of the memory array by means of its gate terminal. The first, second and third clock supply potentials are synchronized to selectively operate their respective MOSFET in a read and a write mode to vary the charge state of the first and second node capacitance when the memory cell is addressed by means of the fourth MOSFET. The digit data line additionally includes a means for precharging the digit data line prior to the address of the memory cell during the read mode for providing nondestructive readout of the binary state of the cell which is defined as the logic state existing at the first circuit node as evidenced by the voltage level present. Additionally the first, second and third clocked supply potentials periodically operate the respective MOSFET to recharge the charged circuit node capacitance to the existing logic state to retain the memory state over long time intervals due to inherent charged decay through the MOSFET junctions.

DESCRIPTION OF THE PREFERRED EMBODIMENT

Before proceeding to the detailed description of the preferred embodiment of the invention, it should be pointed out that "surface" field effect devices and more particularly metal oxide semiconductor field effect transistors hereinafter referred to as MOSFET's are well known to those skilled in the art. Furthermore, such devices and their characteristics are discussed in detail in a publication entitled "IEE Transactions on Electronic Devices," July, 1964, pages 324 –345. Briefly, however, the MOSFET is a device which includes a gate or input terminal, a first current-conducting output terminal or source terminal and a second current-conducting output terminal or drain terminal. The device is a bilateral device and is substantially symmetrical so that the source and drain terminals are effectively interchangeable. Moreover, when a power supply potential of a proper polarity is applied across the source and drain terminals, a gate signal applied between the source and gate terminal will cause the device to "threshold" or conduct and operate as a closed switch. The gate-to-source signal normally required to reach the threshold level of the device is in the order of 4 to 5 volts. Furthermore, the field effect transistor can be operated as a nonlinear resistor by directly connecting the drain and gate terminals together.

Figures 1, 2:
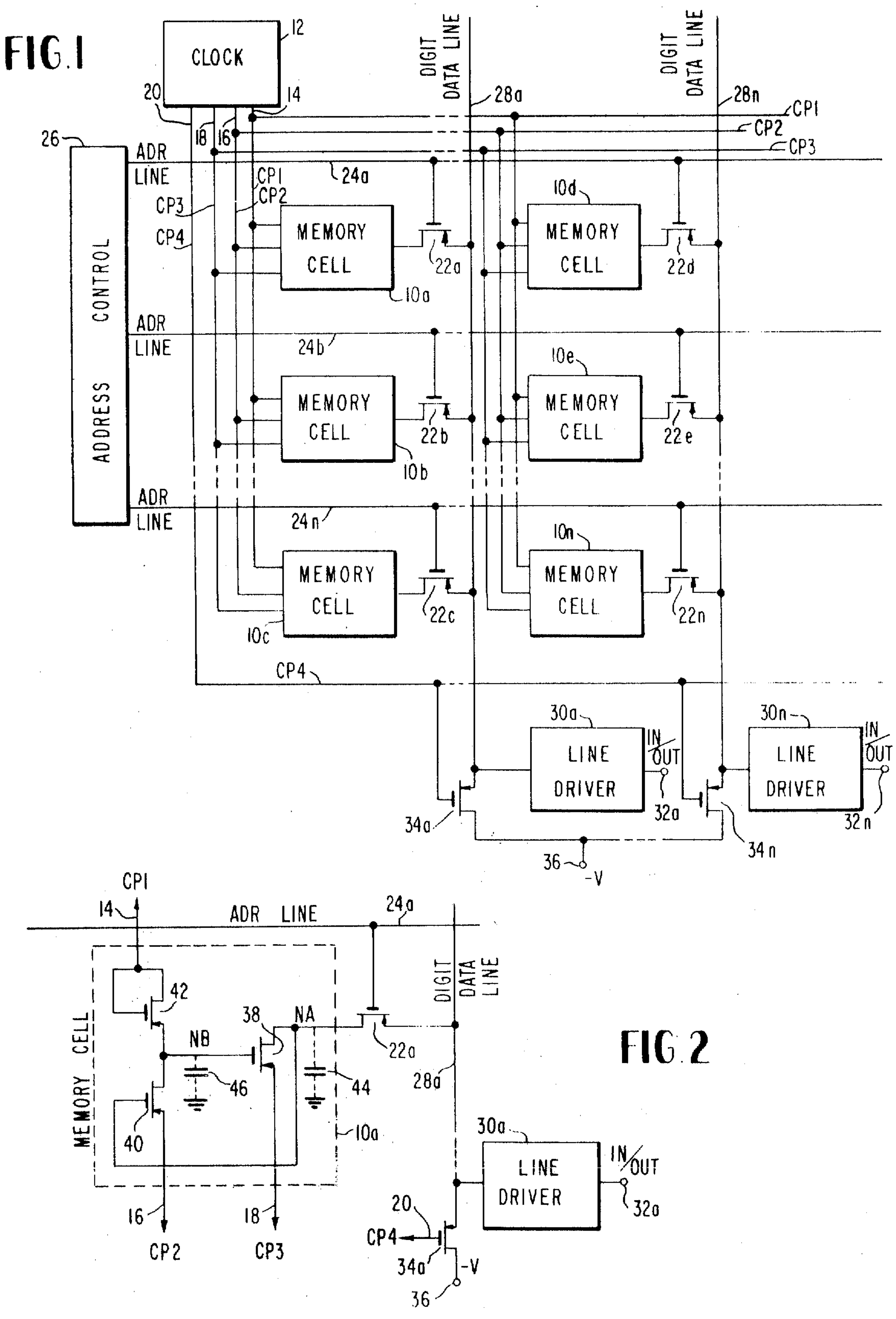
FIG. 1 is a block diagram of a digital memory array employing a plurality of memory cells as taught by the subject invention.
FIG. 2 is a schematic diagram of the preferred embodiment of a memory cell constructed in accordance with the present invention.

Referring now to FIG. 1, there is illustrated a digital memory array comprised of a plurality of memory cells 10*a*...10*n* driven by a multiphase clock 12, which is adapted to provide four outputs of clock signals CP1, CP2, CP3, and CP4 on the circuit busses 14, 16, 18, and 20, respectively. The clock signals CP1, CP2, and CP3 are applied as clocked power supply potentials to the cells 10*a*...10*n* as will be described subsequently. Associated with each of the memory cells 10*a*...10*n* is a selection switch MOSFET identified by reference numerals 22*a*...22*n* which is connected by its gate electrode to one of a plurality of address circuit lines 24*a*...24*n* connected to a memory cell address control unit 26. The selection switch MOSFET couples the respective memory cell to one of a plurality of digit data lines 28*a*...28*n* by means of its drain and source terminals. In the instant embodiment, the selection switch MOSFET 22*a*...22*n* are shown comprised of P-channel devices wherein the source terminal is connected to the respective digit data line.

Each of the digit data lines 28*a*...28*n* comprises a common input/output data line whereupon the data is fed into and out of the data line by means of a respective line driver circuit 30*a*...30*n* and having respective input/output terminals 32*a*...32*n*. Additionally, each of the data lines 28*a*...28*n* is coupled to respective precharging MOSFET's 34*a*...34*n*. In the embodiment shown in FIG. 1, the precharging MOSFET's 34*a*...34*n* are shown comprising P-channel devices wherein the source terminal is connected to the respective digit data line 28*a*...28*n* and the drain terminal is connected to a source of negative supply potential applied to terminal 36. The gate terminal of each of the precharging MOSFET's 34*a*...34*n* is coupled to the circuit buss 20 which conducts the clock signal CP4. This clock signal is adapted to simultaneously operate the precharging MOSFET's 34*a*...34*n* in the first portion of the read cycle as will be explained subsequently.

Referring now to FIG. 2, there is disclosed an electrical schematic diagram of a typical memory cell 10*a* of the plurality of memory cells 10*a*...10*n*. It is shown comprised of a first P-channel MOSFET 38, a second P-channel MOSFET 40, and a third P-channel MOSFET 42. The drain terminal of the first MOSFET 38 is directly connected to the gate terminal of the second MOSFET 40 defining a circuit node NA thereat while the drain terminal of the second MOSFET 40 and source terminal of the third MOSFET 42 is directly connected to the gate terminal of the first MOSFET 38 defining a second circuit node NB thereat. Associated with each of the circuit nodes NA and NB is a node capacitance 44 and 46 respectively which comprises the composite circuit capacitance of the field effect devices connected at that point. The source terminal of the MOSFET 38 is adapted to be coupled to the circuit buss 18 containing the clocked supply potential CP3 while the source terminal of MOSFET 40 is adapted to be coupled to the circuit buss 16 containing the clocked supply potential CP2. The drain and gate terminals of the third MOSFET 42 are commonly coupled together and are adapted to be connected to the circuit buss 14 which contains the clocked supply potential CP1.

Since the MOSFET devices 38, 40, and 32 are disclosed as being P-channel transistors, they will become conductive, when a negative potential is applied across the drain and source terminals simultaneously with a negative potential applied to the gate terminal sufficient to exceed the threshold level of the device. The MOSFET is then said to be turned "on" and acts like a pair of closed switch contacts, i.e., the device exhibits an extremely low resistance between the drain and source terminals. For N-channel devices, a potential of opposite or positive polarity would be utilized.

The operation of the memory array shown in FIG. 1 was discussed earlier and operates to provide selective address of the memory cells 10*a*...10*n* from the memory cell address control unit 26 and the clock circuit 12 to translate binary digit data to and from the common input/output lines 28*a*...28*n*. As noted, the clock signals CP1, CP2 and CP3 act as clocked power supply potentials to each of the memory cells 10*a*...10*n*; however, the fourth clock signal CP4 is adapted to energize the precharging MOSFET's 34*a*...34*a*to selectively precharge the digit data lines 28*a*...28*n* during a first portion of the read mode of operation.

Figure 3:
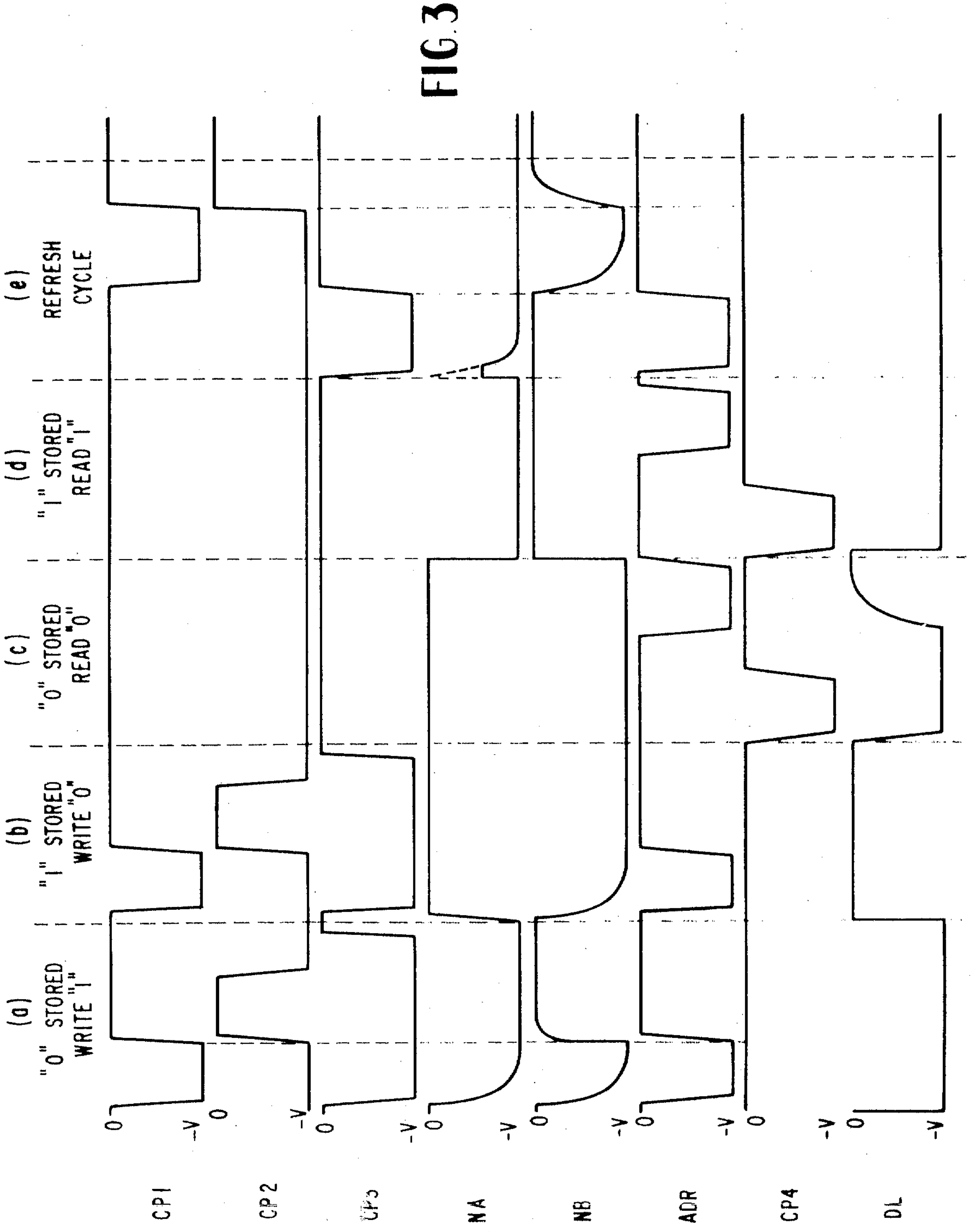
FIGS. 3(*a*)–3(*e*) are illustrative waveforms helpful in understanding the operation of the subject invention.

Considering now the operation of the typical memory cell 10*a* disclosed in FIG. 2, attention is additionally called to waveforms shown in FIGS. 3(*a*)–3(*e*). It should be observed first of all that MOSFET 38 and 40 cannot become conductive in the embodiment shown in FIG. 2 as long as the respective clocked power supply potentials CP3 and CP2, respectively, are "down," i.e., at a negative supply potential –V which may be, for example, –10 volts. This is due to the fact that P-channel devices are shown. Where N-channel devices are utilized, a +V would be applied. With respect to MOSFET 42, however, it will be in a nonconductive state as long as the power supply potential CP1 is "up" i.e., at zero or ground potential. However, MOSFET 42 will become conductive when CP1 goes "down."

The logic state of the memory cell 10 is said to be in a binary logic "1" state when the voltage level at the node NA is at a negative potential and at a binary "0" state when the voltage level at node NA is a zero or ground potential. Considering now the read and write modes of operation as well as a "refresh" mode, the write mode will be considered first. Assuming that a binary "0" state is stored in the memory cell 10*a* whereby the voltage at node NA is at ground potential and it is desired to write a binary "1" into the cell, an input signal is applied to the digit data line 28*a* so that a negative potential –V appears thereon as shown by the waveform DL shown in FIG. 3(*a*). At the beginning of the write mode, MOSFET 40 and 38 are "off" due to the fact that the supply potentials CP2 and CP3 are at –V as shown by waveforms CP2 and CP3 of FIG. 3(*a*). MOSFET 42, however, is driven "on" as the supply potential CP1 goes from ground to –V whereupon the node capacitance 46 associated with circuit node NB charges to a negative supply potential –V. This is shown by waveform NB of FIG. 3(*a*). Next the memory cell is addressed by means of MOSFET 22*a* being turned "on" by means of a potential such as shown by waveform ADR of FIG. 3(*a*) whereupon the node capacitance 44 charges to potential appearing on the digit line 28*a*, which in the present example is a binary "1" level or –V. Next MOSFET's 42 and 38 are turned "off" simultaneously with the selection switch MOSFET 22*a*. The supply potential CP2 coupled to MOSFET 40 also rises from –V to ground (zero) potential. Since the node capacitance 44 is charged negative, MOSFET 40 turns "on" which will then discharge the node capacitance 46 through the conductive MOSFET 40. In the last step of the write mode, the supply potential CP2 is again lowered to the negative voltage –V and the supply potential applied to MOSFET 38 is returned to ground potential. Inasmuch as the node capacitance 46 is discharged to ground potential, the MOSFET 38 will remain "off." Therefore, the state of the memory cell is now a binary "1" due to the fact that the node NA is at a negative potential –V and held there by the charge on the node capacitance 44.

In the situation where a binary "1" is stored and it is desired to write a binary "0" into the memory cell, the waveforms shown in FIG. 3(*b*) illustrates that the node capacitance 46 is initially charged as before, however, when MOSFET 22*a* is turned "on" the node capacitance 44 will discharge therethrough to the digit data line 28*a* which is at ground potential. When the supply potential CP2 goes to ground potential MOSFET 40 will remain "off" due to the fact that the node potential of the circuit node NA is also at ground potential, thereby establishing the desired relationship between the potential levels at nodes NA and NB.

Considering now the read mode which is disclosed by the waveforms shown in FIGS. 3(*c*) and 3(*d*) the digit data line 28*a* is precharged through the MOSFET 34*a* to a negative potential –V as shown by the waveform DL. This precharging is accomplished by means of the clock signal CP4 being applied to the gate of MOSFET 34*a* causing it to become conductive and apply the –V potential to the digit data line 28*a*. Considering FIG. 3(*c*) which is indicative of the condition wherein a logic "0" is stored in the memory cell, the potential at node NA is at ground potential and the selection switch MOSFET 22*a* is turned "on"; however, the potential at the circuit node NB is at a negative potential due to the fact that the charge on the node capacitance 46 has been retained. The supply potential CP3 is continuously maintained at ground potential during the read mode. MOSFET 38 turns "on" since the negative potential of the digit data line appears at the drain terminal through MOSFET 22*a* whereupon the digit data line 28*a* discharges to a logic "0" state through MOSFET 22*a* and MOSFET 38, thereby reading a binary "0" on the digit data line.

If, however, a logic "1" is stored as shown by the waveforms in FIG. 3(*d*), the digit data line 28*a*, is again precharged as shown by waveform DL but the potential at circuit node NA is now at a –V potential. When the MOSFET 22*a* is turned "on," the charged node capacitance 44 and the digit data line 28a are substantially at the same charge or voltage level. Therefore, the state of the digit line and the node capacitance remain unchanged. During the part of the read cycle just described, both MOSFET 42 and 40 were turned "off" because of the voltage levels of the supply potentials CP1 and CP2, respectively, therefore the charge on the node capacitance 46 is said to be "trapped."

Since the circuit operation causes a charge to be trapped on the node capacitance 44 during the write "1" and on the node capacitance 46 during a read "1" condition, the charge on these capacitors changes but only an insignificant amount over the time intervals required to execute the operations described thus far and shown with respect to FIGS. 3(*a*)–3(*d*). However, over long time intervals, the charge will decay through the respective MOSFET junctions to a point the memory cell 10a will not retain the correct information. To prevent this condition, a "refresh" mode is provided which is shown by the waveforms in FIG. 3(e).

Basically, the refresh mode consists of recharging either of the node capacitance 44 or 46, depending upon which one is presently charged, to the full −V level. First node capacitance 44 is charged negatively by lowering the supply potential CP3 to the −V level rendering MOSFET 38 inoperative. MOSFET 22a is turned "on" and a negative potential −V is applied to the digit line 28a by means of the clock signal CP4 coupled to the gate terminal of the precharging MOSFET 34a. Next the selection switch MOSFET 22a is turned "off" and the CP3 potential applied to MOSFET 38 is raised to ground potential. If the node capacitance 46 is near ground potential, MOSFET 38 will not turn "on" and the negative charge will remain on the node capacitance 44; but if the node capacitance 46 is charged to a negative potential, MOSFET 38 turns "on" and the node capacitor 44 will be discharged to substantially ground potential. Following this, MOSFET 38 is turned "off" by the lowering of the supply potential CP3 and MOSFET 42 is turned "on" by the potential CP1 causing the node capacitance 46 to be charged negatively. In the last step MOSFET 42 is turned "off" and CP2, which is applied to MOSFET 40, is raised from a negative potential to ground potential. If the node capacitance 44 is charged negatively, the node capacitance 46 will be discharged to ground potential by MOSFET 40. On the other hand, if the node capacitance 44 is not discharged, the node capacitance 46 remains negatively charged. Finally, the potential CP2 is lowered to a negative voltage −V and CP3 is returned to ground potential.

What has been shown and described, therefore, is an improved MOSFET memory cell capable of providing a nondestructive readout of the binary digital information stored therein. Additionally, the cell is adapted to be periodically recycled to restore the charged state of the cell to maintain the required information over extended time intervals.

We claim as our invention:

1. A binary digital memory cell coupled to input and output data means and operated from a plurality of clocked supply potentials comprising in combination:

a first, a second, and a third semiconductor switch, each having an input terminal and a first and a second output terminal including circuit means coupling the first output terminal of the first semiconductor switch to the input terminal of the second semiconductor switch defining a first circuit node, means commonly coupling the first output terminal of said second semiconductor switch and a second output terminal of said third semiconductor switch to the input terminal of said first semiconductor switch defining a second circuit node, circuit means commonly connecting the input terminal and the first output terminal of said third semiconductor switch together, means coupling one of said plurality of clocked power supply potentials to the second output terminal of said first semiconductor switch, means coupling a second power supply potential of said plurality of clocked power supply potentials to the second output terminal of the second semiconductor switch, and circuit means coupling a third power supply potential of said plurality of clocked power supply potentials to the common connection of the input terminal and said first output terminal of said third semiconductor switch, and circuit means selectively coupling said first circuit node to said input and output data means.

2. The invention as defined by claim 1 wherein said first, second and third semiconductor switches are comprised of surface field effect transistors.

3. The invention as defined by claim 2 wherein said surface field effect transistors are metal oxide semiconductor field effect transistors.

4. In combination: A memory cell comprised of a first, a second, a third field effect transistor, each having gate, drain and source terminals, including circuit means coupling the drain terminal of the first field effect transistor to the gate terminal of the second field effect transistor defining a first circuit node and including a first node capacitance, and means commonly coupling the drain terminal of said second field effect transistor and the source terminal of the third field effect transistor to the gate terminal of said first field effect transistor defining a second circuit node and including a second node capacitance;

clock circuit means generating at least a first, a second and a third synchronized clock signal including circuit means commonly coupling said first clock signal to the gate and drain terminals of said third field effect transistor, circuit means coupling said second clock signal to the source terminal of said second field effect transistor, and circuit means coupling said third clock signal to the source terminal of the first field effect transistor said first, second and third clock signals acting as supply potentials and said first and second field effect transistors becoming conductive in response to the charge state of said first and second node capacitance in combination with the application of said second and third clock signals;

memory cell address means coupled to said first circuit node and adapted to provide signal translation when operated in accordance with a signal applied thereto, said signal translation being a binary digital data signal into and out of the memory cell; and common input/output data means coupled to said memory operative. cell address means, being coupled to said first circuit node upon said memory cell address means being rendered operative.

5. The invention as defined by claim 4 wherein said memory cell address means comprises an address line and a fourth field effect transistor acting as a selector switch and having gate, drain and source terminals and including circuit means coupling said gate terminal to said address line and said drain and source terminals between said first circuit node and said common input/output data means.

6. The invention as defined by claim 5 and wherein said common input/output data means includes a digit data line and means for coupling a binary logic signal to and from said digit data line.

7. The invention as defined by claim 6 and additionally including a fifth field effect transistor having gate, drain and source terminals;

a fourth time related clock signal generated by said clock circuit means, circuit means coupling said fourth signal voltage to the gate terminal of said fifth field effect transistor, and circuit means coupling said drain and source terminals between said digit data line and a reference potential for altering the charge state of said digit data line during a first portion of a read mode for providing nondestructive readout of the data stored in the memory cell.

8. The invention as defined by claim 7 wherein said reference potential comprises a fixed supply potential selectively coupled to one of either the drain or source terminals of said fifth field effect transistor for selectively precharging the data line upon said fifth field effect transistor being rendered operative by said fourth clock signal.

9. The invention as defined by claim 8 wherein said fixed supply potential is coupled to said drain terminal of said fifth field effect transistor.

10. The invention as defined by claim 8 and wherein said fourth field effect transistor is coupled by means of its source terminal to the digit data line and by means of its drain terminal to said first circuit node.

11. The invention as defined by claim 8 wherein all of said field effect transistors are comprised of metal oxide semiconductor field effect transistors.

12. The invention as defined by claim 11 wherein said metal oxide semiconductor field effect transistors are comprised of devices having like semiconductivity.